US012110951B2

(12) United States Patent
Fisk et al.

(10) Patent No.: US 12,110,951 B2
(45) Date of Patent: Oct. 8, 2024

(54) DOUBLE CLUTCH REVERSE AND ACTIVE TORQUE MANAGEMENT SYSTEM

(71) Applicant: TEAM Industries, Inc., Bagley, MN (US)

(72) Inventors: Jordan E. Fisk, Bemidji, MN (US); Brandon P. Lenk, Shevlin, MN (US); Alexander C. Yudell, Bemidji, MN (US); Bruce H. Younggren, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 17/861,219

(22) Filed: Jul. 10, 2022

(65) Prior Publication Data
US 2023/0011517 A1  Jan. 12, 2023

Related U.S. Application Data

(60) Provisional application No. 63/220,869, filed on Jul. 12, 2021.

(51) Int. Cl.
F16H 37/02 (2006.01)
F16D 25/10 (2006.01)
(Continued)

(52) U.S. Cl.
CPC .......... F16H 37/022 (2013.01); F16D 25/10 (2013.01); F16H 61/662 (2013.01); F16H 2061/6608 (2013.01); F16H 2061/661 (2013.01)

(58) Field of Classification Search
CPC .......... F16H 61/662; F16H 2061/6608; F16H 2061/661; F16H 61/66; F16H 61/66272;
(Continued)

(56) References Cited

U.S. PATENT DOCUMENTS 5,470,285 A  11/1995 Schneider et al.
5,690,576 A  11/1997 Moroto et al.
(Continued)

FOREIGN PATENT DOCUMENTS

CA  2456633 A1  7/2004
DE  20014160 U1  11/2001
(Continued)

OTHER PUBLICATIONS

International Bureau, "International Preliminary Report on Patentability from PCT Application No. PCT/US2018/052607", from Foreign Counterpart to U.S. Appl. No. 16/141,227, filed Apr. 9, 2020, pp. 1 through 7, Published: WO.
(Continued)

Primary Examiner — Jacob S. Scott
Assistant Examiner — Farhana Pervin
(74) Attorney, Agent, or Firm — Fogg & Powers LLC

(57) ABSTRACT

A double clutch reverse and active torque management system is provided. A forward variable torque limiting clutch selectively couples torque between a driven sheave of a continuously variable transmission (CVT) and at least one drive axle of a vehicle when the vehicle is traveling in a forward direction. The forward variable torque limiting clutch is set to transmit less torque than can be transmitted through each of the drive sheave and the driven sheave of the CVT. A reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of the CVT, wherein any slip caused by excessive torque occurs at one of the forward variable torque limiting clutch and the reverse variable torque limiting clutch.

20 Claims, 12 Drawing Sheets

(51) Int. Cl.
*F16H 61/662* (2006.01)
*F16H 61/66* (2006.01)

(58) Field of Classification Search
CPC ............ F16H 2061/6618; F16H 37/022; F16H 2037/026; F16D 25/10
See application file for complete search history.

(56) References Cited

U.S. PATENT DOCUMENTS

| | | | |
|---|---|---|---|
| 6,461,268 | B1 | 10/2002 | Milner |
| 7,410,042 | B2 | 8/2008 | Ochab et al. |
| 8,298,119 | B2 | 10/2012 | Jozaki et al. |
| 8,469,856 | B2 | 6/2013 | Thomassy |
| 8,620,539 | B2 | 12/2013 | Urata et al. |
| 8,870,711 | B2 | 10/2014 | Pohl et al. |
| 9,371,896 | B2 | 6/2016 | Kobayashi et al. |
| 9,388,884 | B2 | 7/2016 | Hibino et al. |
| 9,546,719 | B2 | 1/2017 | Samie et al. |
| 10,088,025 | B2 | 10/2018 | Yamada et al. |
| 10,240,667 | B2 | 3/2019 | Walter |
| 10,830,324 | B2 | 11/2020 | Younggren et al. |
| 2003/0162620 | A1* | 8/2003 | Kmicikiewicz ........ B60K 6/365 903/910 |
| 2003/0171867 | A1* | 9/2003 | Nakamori ............. B60W 20/00 903/903 |
| 2004/0209732 | A1* | 10/2004 | Eguchi .............. F16H 61/66272 477/44 |
| 2006/0160652 | A1* | 7/2006 | Maki ....................... F16H 48/24 475/248 |
| 2007/0144283 | A1 | 6/2007 | Hasegawa et al. |
| 2011/0028260 | A1 | 2/2011 | Kawasaki et al. |
| 2013/0096790 | A1 | 4/2013 | Nelson |
| 2015/0345570 | A1 | 12/2015 | Tsukuda et al. |
| 2018/0180147 | A1* | 6/2018 | Chida ..................... F16D 25/10 |
| 2018/0252315 | A1 | 9/2018 | Rippelmeyer et al. |
| 2018/0363763 | A1 | 12/2018 | Pohl et al. |
| 2019/0093745 | A1 | 3/2019 | Younggren et al. |
| 2019/0242473 | A1 | 8/2019 | Hagihara |
| 2019/0308605 | A1* | 10/2019 | Akiyoshi ............. B60W 10/182 |
| 2020/0262292 | A1 | 8/2020 | Younggren et al. |
| 2020/0400221 | A1 | 12/2020 | Yudell et al. |
| 2020/0400222 | A1 | 12/2020 | Yudell et al. |
| 2021/0293333 | A1* | 9/2021 | Yoon ................. F16H 61/66272 |
| 2021/0341039 | A1* | 11/2021 | Kuroki ...................... F16H 9/18 |
| 2022/0042842 | A1* | 2/2022 | Bunazawa ................ F16H 7/08 |

FOREIGN PATENT DOCUMENTS

| | | |
|---|---|---|
| EP | 0063786 A1 | 11/1982 |
| EP | 184676 A | 6/1986 |
| EP | 0787927 A2 | 8/1997 |
| EP | 2275706 A1 | 1/2011 |
| JP | 2013167322 A | 8/2013 |
| WO | 2007135428 A1 | 11/2007 |
| WO | 2017049049 A1 | 3/2017 |

OTHER PUBLICATIONS

International Bureau, "International Preliminary Report on Patentability from PCT Application No. PCT/US2020/019068", from Foreign Counterpart to U.S. Appl. No. 16/796,488, filed Sep. 2, 2021, pp. 1 through 10, Published: WO.

International Searching Authority, "International Search Report and Written Opinion from PCT Application No. PCT/US2018/052607", Dec. 20, 2018, from Foreign Counterpart to U.S. Appl. No. 16/141,227, pp. 1-13, Published: US.

International Searching Authority, "International Search Report and Written Opinion from PCT Application No. PCT/US2020/019068", from Foreign Counterpart to U.S. Appl. No. 16/796,488, filed Apr. 20, 2020, pp. 1 through 13, Published: WO.

U.S. Patent and Trademark Office, "Final Office Action", U.S. Appl. No. 16/796,488, filed Jan. 31, 2022, pp. 1 through 11, Published: US.

U.S. Patent and Trademark Office, "Notice of Allowance", U.S. Appl. No. 16/141,227, filed Jul. 10, 2020, pp. 1 through 13, Published: US.

U.S. Patent and Trademark Office, "Notice of Allowance", U.S. Appl. No. 16/796,488, filed Mar. 11, 2022, pp. 1 through 9, Published: US.

U.S. Patent and Trademark Office, "Notice of Allowance", U.S. Appl. No. 16/796,488, filed Jun. 24, 2022, pp. 1 through 11, Published: US.

U.S. Patent and Trademark Office, "Office Action", U.S. Appl. No. 16/141,227, filed Mar. 26, 2020, pp. 1-15, Published: US.

U.S. Patent and Trademark Office, "Office Action", U.S. Appl. No. 16/796,488, filed Oct. 1, 2021, pp. 1 through 39, Published: US.

U.S. Patent and Trademark Office, "Office Action", U.S. Appl. No. 16/906,464, filed May 2, 2022, pp. 1 through 39, Published: US.

U.S. Patent and Trademark Office, "Restriction Requirement", U.S. Appl. No. 16/141,227, filed Jan. 13, 2020, pp. 1 through 6, Published: US.

U.S. Patent and Trademark Office, "Restriction Requirement", U.S. Appl. No. 16/906,452, filed May 3, 2022, pp. 1 through 6, Published: US.

* cited by examiner

DOUBLE CLUTCH REVERSE AND ACTIVE TORQUE MANAGEMENT SYSTEM

CROSS-REFERENCE TO RELATED APPLICATIONS

This Application claims priority to U.S. Provisional Application Ser. No. 63/220,869, entitled CONTINUOUSLY VARIABLE TRANSMISSION WITH DOUBLE CLUTCH REVERSE UNIT AND ACTIVE TORQUE MANAGEMENT, filed on Jul. 12, 2021, which is incorporated in its entirety herein by reference.

BACKGROUND

A typical continuously variable transmission (CVT) includes a drive or primary sheave that is rotationally coupled to a motor and driven or secondary sheave that is rotationally coupled to a drive train. The drive and driven sheaves, sometimes referred to as a drive clutch or pulley and driven clutch or pulley of a CVT, are rotationally coupled to each other with the use of an endlessly looped member such as a belt. One type of belt is a steel belt. CVTs that use a steel belt are capable of delivering a wide gear ratio range from a single device. This enables the engine to operate at peak efficiency or peak power at a wide range of vehicle speeds. However, it also means that the torque, that must be transmitted by the driven pulley of a CVT, can range from a multiplier less than the peak engine torque to a multiplier greater than the peak engine torque. Moveable sheave members on the drive and driven sheaves may be controlled with hydraulic pressure. The hydraulic clamp load and the running radius of the belt determine the torque that can be transmitted to the driven pulley before major slip occurs at the belt/sheave interface. This type of slip can be damaging to the CVT including steel belt CVTs (SBCVTs) and should be avoided.

SBCVTs are currently employed by the auto industry in passenger car applications. In these applications, torque spikes coming from the wheels are typically of low magnitude. The automotive industry is able to prevent slip, due to these spikes, by over-clamping at the drive and driven pulleys, thus allowing the clutches to transmit the torque spikes without major slip.

In more strenuous applications, such as in trucks or off-road vehicles, torque spikes to the driveline from the wheels are more common. Torque spikes and reversals are caused by rough roads, rolling bumps and vehicle jumping activities. These spikes can be equal to several times the maximum wheel torque provided by the prime mover. Over-clamping to protect against spikes of this magnitude would lead to unacceptable drivetrain inefficiency due to friction losses between the pulleys and the belt.

For the reasons stated above and for other reasons stated below which will become apparent to those skilled in the art upon reading and understanding the present specification, there is a need in the art for a system that effectively and efficiently deals with torque spikes without affecting a CVT.

SUMMARY OF INVENTION

The following summary is made by way of example and not by way of limitation. It is merely provided to aid the reader in understanding some of the aspects of the subject matter described. Embodiments provide a double clutch reversing and torque management system that is positioned between a driven sheave of a CVT and wheel axles of a vehicle.

In one example, a double clutch reverse and active torque management system is provided. The system includes a forward variable torque limiting clutch and a reverse variable torque limiting clutch. The forward variable torque limiting clutch selectively couples torque between a driven sheave of a continuously variable transmission (CVT) and at least one drive axle of a vehicle when the vehicle is traveling in a forward direction. The forward variable torque limiting clutch is set to transmit less torque than can be transmitted through each of a drive sheave and the driven sheave of the CVT. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and the driven sheave of the CVT, wherein any slip caused by excessive torque occurs at one of the forward variable torque limiting clutch and the reverse variable torque limiting clutch.

In another example, another double clutch reverse and active torque management system is provided. The system includes a forward variable torque limiting clutch, a forward actuator, a reverse variable limiting clutch, and a reverse actuator. The forward variable torque limiting clutch selectively couples torque between a driven sheave of a continuously variable transmission (CVT) and at least one drive axle of a vehicle when the vehicle is traveling in a forward direction. The forward variable torque limiting clutch is set to transmit less torque than can be transmitted through each of a drive sheave and the driven sheave of the CVT. The forward variable torque limiting clutch includes a forward clutch pack. The forward actuator is in operational communication with a forward piston to selectively assert a force on the forward clutch pack to activate the forward variable torque limiting clutch. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of the CVT. The reverse variable torque limiting clutch includes a reverse clutch pack. The reverse actuator is in operational communication with a reverse piston to selectively assert a force on the reverse clutch pack to activate the reverse variable torque limiting clutch.

In yet another embodiment, a vehicle is provided. The vehicle includes a motor to generate engine torque, a CVT, a belt, at least one drive axle and a double clutch reverse and active torque management system. The CVT including a drive sheave and a driven sheave. The belt is communicatively engaged with the drive sheave and the driven sheave. The double clutch reverse and active torque management system includes a forward variable torque limiting clutch and a reverse variable torque limiting clutch. The forward variable torque limiting clutch selectively couples torque between the driven sheave of the CVT and the at least one drive axle of the vehicle when the vehicle is traveling in a forward direction. The forward variable torque limiting clutch is set to transmit less torque than can be transmitted through each of the drive sheave and driven sheave of each of the drive sheave and driven sheave of the CVT. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of each of the drive sheave and driven sheave of the CVT, wherein any slip caused by excessive torque occurs at one of the forward variable torque limiting clutch and the reverse variable torque limiting clutch.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
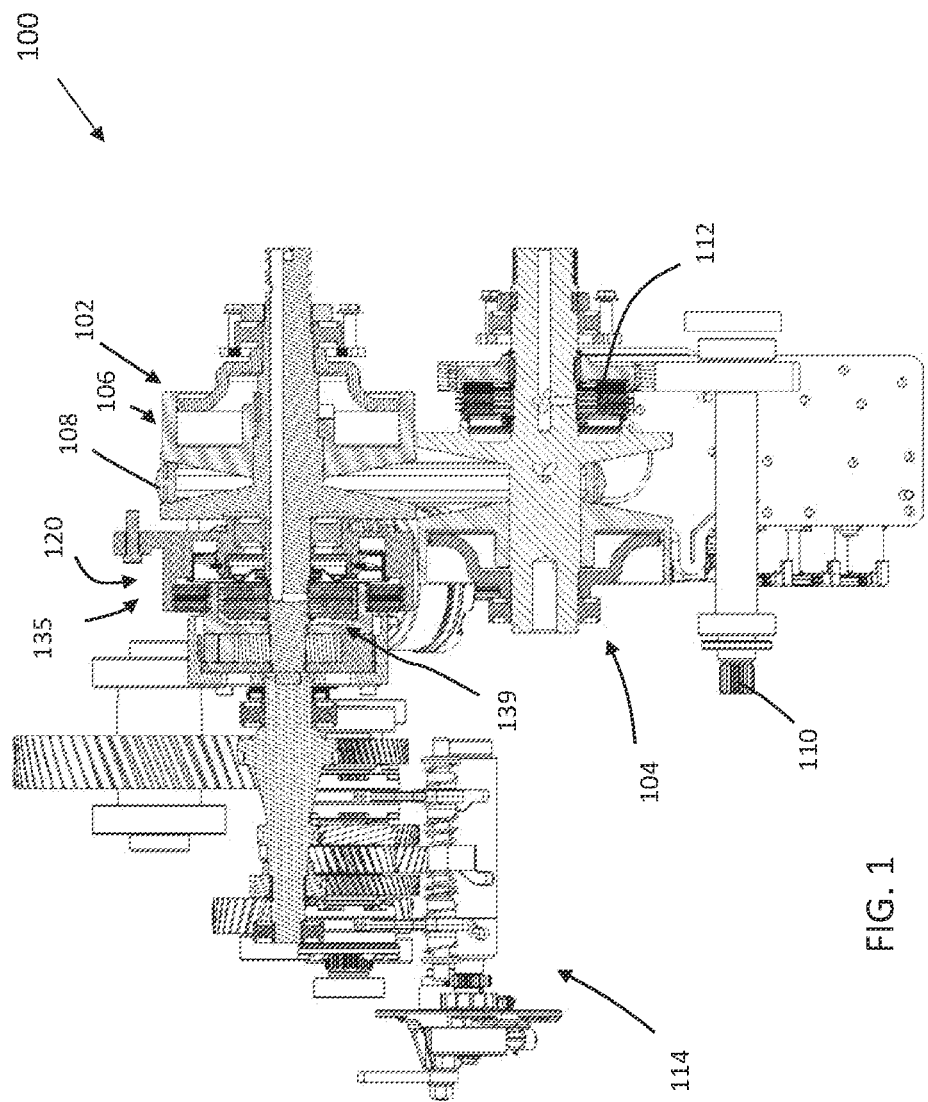
FIG. 1 is a cross-sectional side view of a CVT and a double clutch reverse and active torque management system with a nested clutch layout according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Certain types of motors, such as internal combustion engines, only generate driving torque in a single direction. Therefore, distinct power paths are required for forward and reverse travel, with the output of one power path spinning the opposite direction relative to the other. In one example embodiment, a continuously variable transmission (CVT) with double clutch reverse and active torque management system is provided. In this type of system, the drive sheave is operationally coupled to a motor to receive engine torque and the driven sheave is in rotational communication with the drive sheave via belt. The belt may be a steel belt in an example. In example embodiments, a forward torque limiting clutch is coupled between the driven sheave and a least one wheel axle of a vehicle to selectively couple torque between the driven sheave and the at least one wheel axle when the vehicle is traveling in a forward direction. Further, a reverse torque limiting clutch is also coupled between the driven sheave and the at least one wheel axle to selectively couple torque between the driven sheave and the at least one wheel axle when the vehicle is traveling in a reverse direction. Examples of layouts used for the double clutch reverse and active torque management system, include but are not limited to, a epicyclic reverse containing one or more sets of planet gears, a parallel axis gear reverse, a spur gear differential used to achieve reverse as discussed below. Other layouts may be used in other examples.

As discussed above and in U.S. application Ser. No. 16/906,464, which is incorporated by reference herein, strong torque spikes may cause damaging slip between the belt (which may be a steel belt) and the sheaves or pulleys of a CVT such as a steel belt CVT (SBCVT). The torque spikes are generated when there is a sudden change in wheel speed due to rough roads or jumping the vehicle. As discussed in U.S. application Ser. No. 16/906,464, the SBCVT can be protected from these spikes by placing a variable torque limiting (VTL) clutch with a breakaway torque less than a transmittable torque of the driven sheave between that driven sheave and the wheels. A VTL clutch may be hydraulically connected to the driven sheave in an example. In this configuration, the driven sheave hydraulic pressure provides both the axial force required to transmit torque to the belt, as well as the thrust force required to clamp clutch plates of a VTL clutch as described below in detail.

A VTL clutch may be activated by other systems including, but not restricted to, hydraulic system, ball ramp, electronic solenoid, mechanical lever, throw cam or any other system of actuating a clutch. In one example, the adjustable clutch may be a multi-plate clutch. In other embodiments any clutching device could fill this purpose including, but not restricted to, a band clutch, a cone clutch or any other type of clutching device. Further in some embodiments, the VTL clutch may be set to always be capable of transmitting less torque than the driven sheave. This ensures that any slip that occurs between the wheels and the drive sheave will occur at the VTL clutch and not between the steel belt and sheave members.

In embodiments, a selected (or active clutch) is controlled to vary the amount of torque it can transfer such that it is greater than the output torque of the CVT, but less than the transmittable torque of the CVT. That is, an active variable torque limiting clutch can transmit all the torque to the ground, but it will slip at a lower torque than the CVT (or the active torque limiting clutch is set to transmit less torque than can be transmitted through each of a drive sheave and a sheave of the CVT). In one example embodiment the active clutch is hydraulically controlled. Forward and reverse clutches, discussed below, may also be controlled so transition from a forward direction to a reverse direction and vice versa may occur without torque interruption. This direction change may not require a change in a pedal position from the driver. Moreover, the forward/reverse set may allow a driver to select forward or reverse without bringing the vehicle to a stop or even letting off on the gas pedal of the vehicle.

Figure 4:
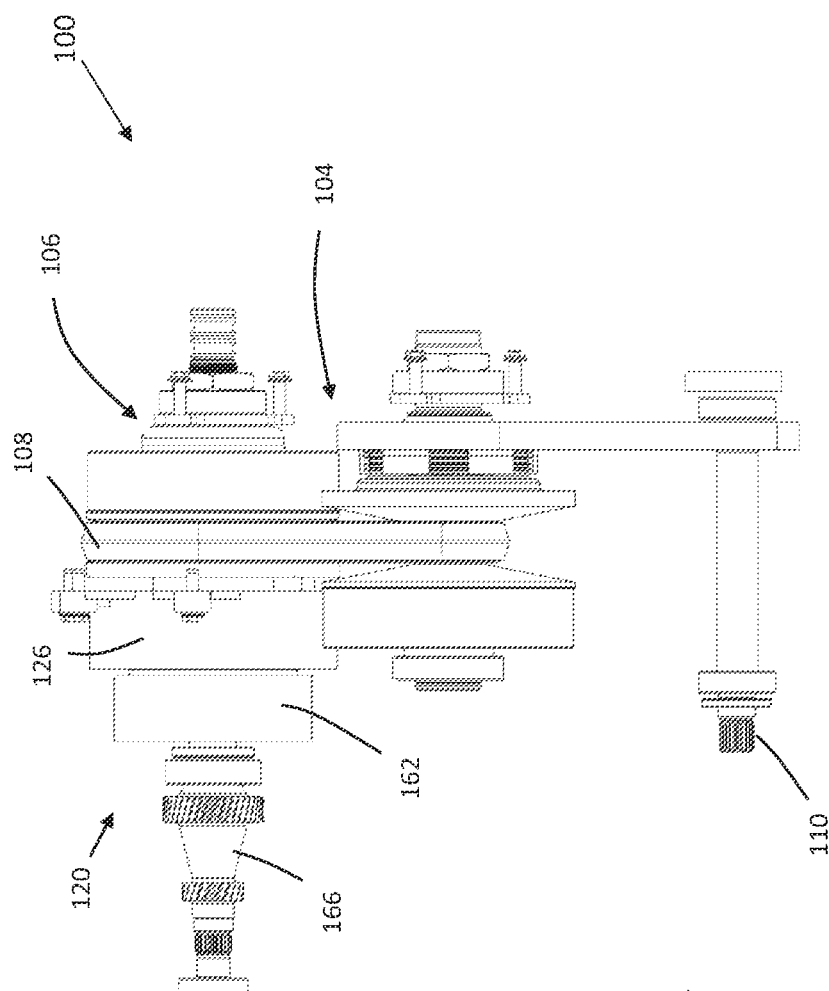
FIG. 4 is a partial side view of the layout 100 illustrated in FIG. 1.

A cross-sectional side view of a layout 100 in FIG. 1 illustrates an example a CVT with double clutch reverse and active torque management system using a nested clutch layout. A side view of the partial layout 100 is further illustrated in FIG. 4. The layout 100 includes a CVT 102 with a drive sheave 104 and driven sheave 106 that are in rotational communication with each other via belt 108 which may be a steel belt. An engine crankshaft 110, which is operationally coupled to drive sheave 104, couples torque between a motor and the drive sheave 104. This example includes an engine clutch 112 positioned between the crankshaft 110 and the drive sheave 104. Also illustrated in the layout is a transmission (or gear box 114) which is part of a drivetrain. Positioned between the driven sheave 106 (or secondary sheave or pulley) and the gear box 114 is a double clutch reverse and active torque management system 120, which in this example, includes a nested clutch layout with an epicyclic gear set for reverse.

Figure 2:
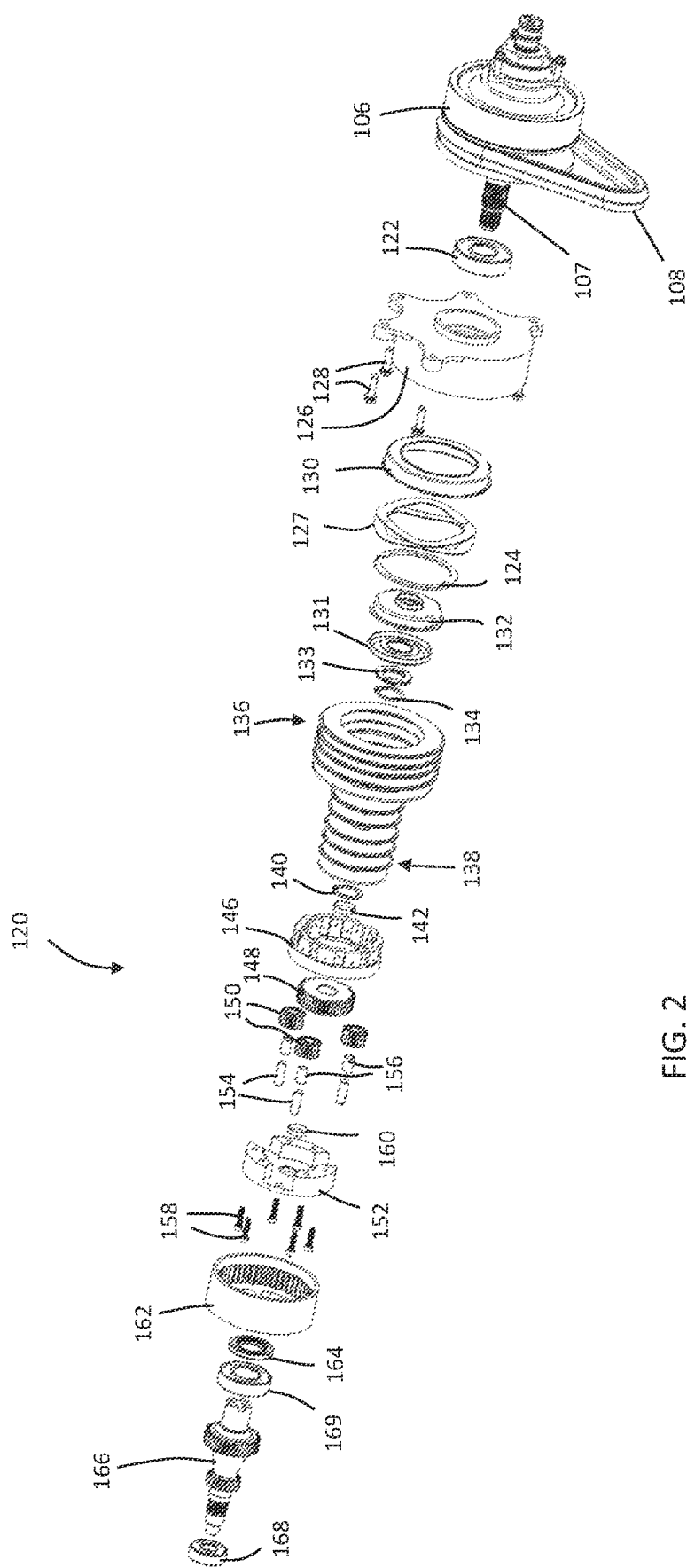
FIG. 2 is an unassembled side view of a double clutch reverse and active torque management system of the layout of FIG. 1 according to one exemplary embodiment.

FIG. 2 illustrates an unassembled view of the double clutch reverse and active torque management system 120 of an example embodiment. Mounted on a sheave shaft 107 of the driven or secondary sheave or pulley 106 is a bearing 122 and a first retaining member 126. The first retaining member 126 is fastened to a case 125 (housing) with a plurality of fasteners 128.

Received within a chamber or cavity of the first retaining member 126 is a reverse clutch piston 130, a reverse clutch biasing member 127 and a retaining ring 124. Retaining ring 124 is received within a groove to an inside protruding member of the bearing retained in which the reverse clutch piston 130 is mounted (best illustrated in the cross-sectional side view of FIG. 3). The reverse clutch biasing member 127 is positioned to bias the reverse clutch away from reverse clutch plates 136 of a reverse variable torque limiting clutch 135.

Also received within the first retaining member 126, in this example, is a forward clutch piston 131 that is mounted on the sheave shaft 107 and is received with a second retaining member 132. A forward clutch biasing member 133 is positioned between a retaining ring 134 (received within a groove in the sheave shaft 107) and the forward clutch piston to bias the forward clutch piston away from the forward clutch plates 138 of a forward variable torque limiting clutch 139. A retaining ring 140 that fits in another groove in the sheave shaft 107 to retain the forward clutch plates 136 in position on the sheave shaft 107.

A clutch basket 146 is partially received within the cavity of the first retaining member 126. The forward clutch plates 138 and forward clutch piston 131 form, in part, a forward variable torque limiting clutch 139 and the reverse clutch plates 136 and reverse clutch piston 130 form, in part, a reverse variable torque limiting clutch 135.

A first set of forward clutch plates 138 are coupled to the clutch basket 146 and a second set of forward clutch plates are coupled to sheave shaft 107. In an example hydraulic pressure selectively applied to the forward clutch piston 131 counters the biasing force of the forward clutch biasing member 133 to assert a select force on the forward clutch pack formed alternating clutch plates (friction and reaction plates) from the first and second set of forward clutch plates 138 to selectively transfer torque between the clutch basket 146 and the sheave shaft 107.

Further, a first set of reverse clutch plates 136 are coupled to another side of the clutch basket 146 and a second set of reverse clutch plates 136 are coupled to the first retaining member 126. In an example hydraulic pressure selectively applied to the reverse clutch piston 130 counters the biasing force of the reverse clutch biasing member 127 to assert a select force on the clutch pack formed by alternating clutch plates (friction and reaction plates) from the first and second set of forward clutch plates 136 to selectively transfer torque between the clutch basket 146 and the first retaining member 126. As discussed above, the first retaining member 126 is coupled to a case 125.

An epicyclic gear set for reverse is used in this example. The epicyclic gear set includes a sun gear 148 that is engaged with sheave shaft 107 of the secondary sheave 106. Planet gears 150 engage the sun gear 148. The planet gears 150 are rotationally coupled to a planet carrier 152 by dowel pin 154 and needle bearing 156 arrangements. Planet carrier bolts 158 couple the planet carrier 152 to the clutch basket 146. A bushing 160 is positioned between the planet carrier 152 and end portion of the sheave shaft 107 of the driven or secondary pulley 106. Further bushing 142 is positioned between the clutch basket 146 and the sheave shaft 107 of the driven or secondary pulley 106.

A ring gear 162 is positioned to engage the planet gears 150. Operationally coupled to the ring gear 162 is a transmission input shaft 166. A transmission seal 164 is positioned between a portion of the transmission input shaft 166 and case 125. Further bearings 168 and 169 are mounted on the transmission input shaft 166 and are positioned between the transmission input shaft 166 and the case 125.

Figure 3:
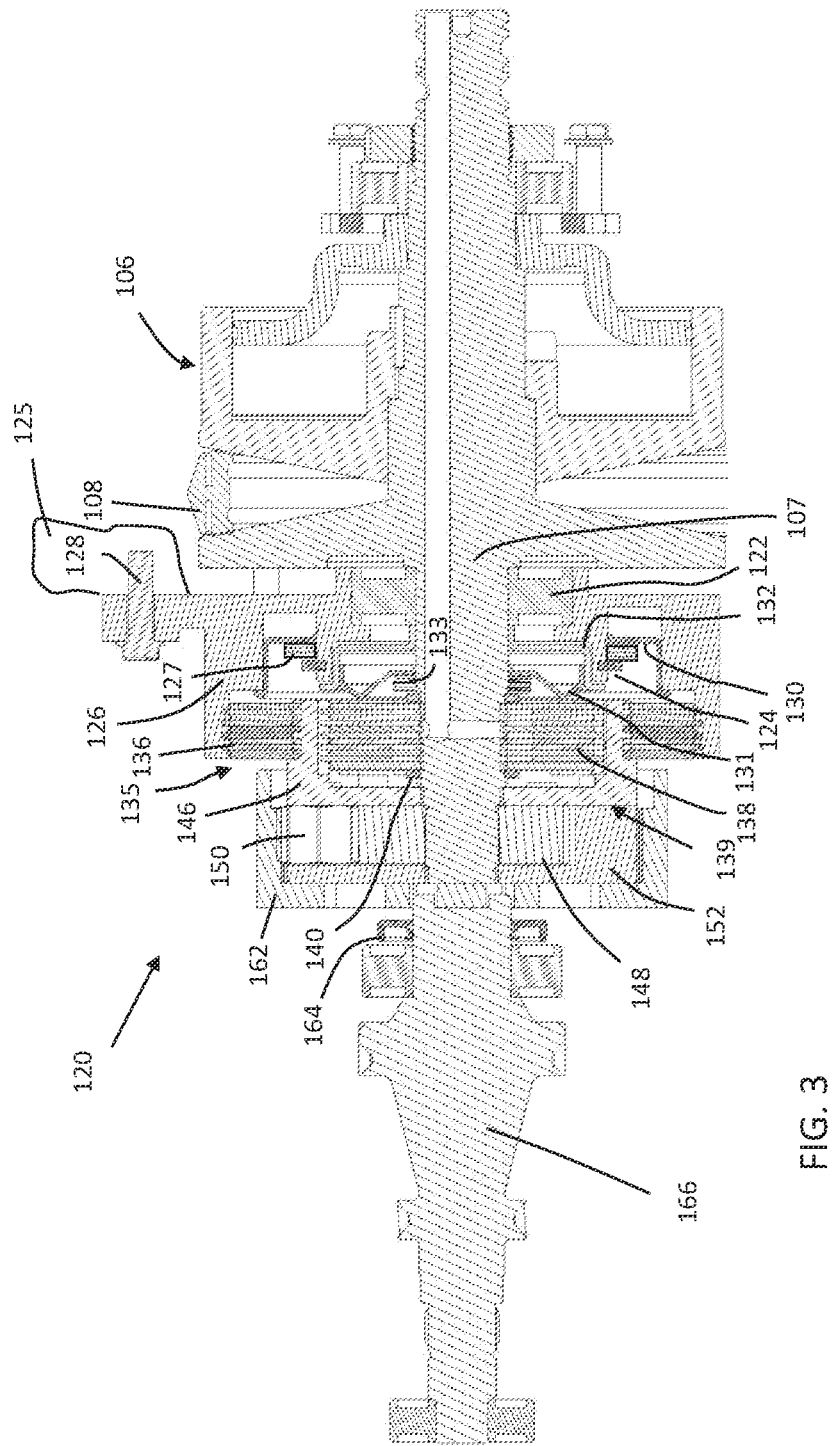
FIG. 3 is an assembled cross-sectional side view of the double clutch reverse and active torque management system of FIG. 2.

As further illustrated in the assembled cross-sectional side view of the double clutch reverse and active torque management system 120 of FIG. 3, the inner or forward variable torque limiting clutch 139 fixes the sun gear 148 to the planet carrier 152. This creates a scenario in which the torque is transmitted through the carrier 152 to the planet gears 150 which transmits the torque to the ring gear 162 through planet gear teeth in a way that the sun gear 148, planet gears 150, carrier 152, and ring gear 162 rotate together as a single assembly for a straight through forward gear. When the outer or reverse variable torque limiting clutch 135 is active, the carrier 152 is fixed to a case 125, partially shown in FIG. 3, which allows the planet gears 150 to act as idler gears, which reverses the direction of rotation of the ring gear 162 and output at a gear reduction of the number of teeth of the ring gear 162 to the number of teeth of the sun gear 148.

In the example using the epicyclic reverse arrangement discussed above, clutching from the sun gear 148 to carrier 152 caused a straight through operation. In another example, a straight through operation is achieved by locking the carrier 152 to the ring gear 162.

Figure 5:
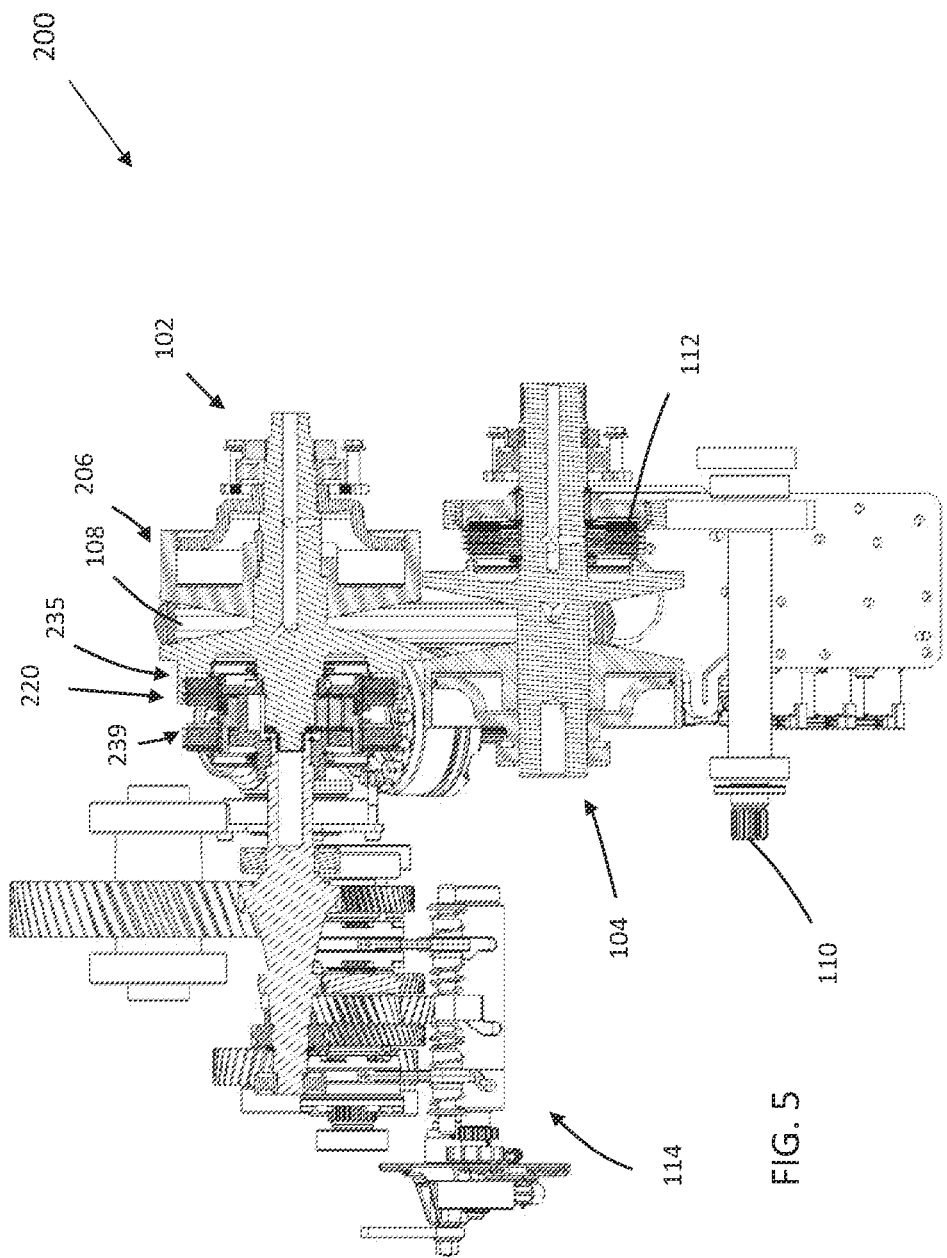
FIG. 5 is a cross-sectional side view of a CVT and a double clutch reverse assembly and active torque management system with a side-by-side clutch layout according to one exemplary embodiment.

In another example embodiment, the variable torque limiting clutches 239 and 235 of a double clutch reverse and active torque management system 220 are positioned side-by-side. An example of a side-by-side layout 200 is illustrated in the cross-sectional side view of FIG. 5. Similar to the embodiment of FIG. 1, layout 200 includes a CVT 102 with a drive sheave 104 and driven sheave 206 that are in rotational communication with each other via belt 108 which may be a steel belt. An engine crankshaft 110, which is operationally coupled to drive sheave 104, couple torques between a motor and the drive sheave 104. This example includes an engine clutch 112 positioned between the crankshaft 110 and the drive sheave 104. Also illustrated in the layout is a transmission 114. Positioned between the driven sheave 206 (or secondary sheave or pulley) and the transmission 114 is a double clutch reverse and active torque management system 220.

Figure 6:
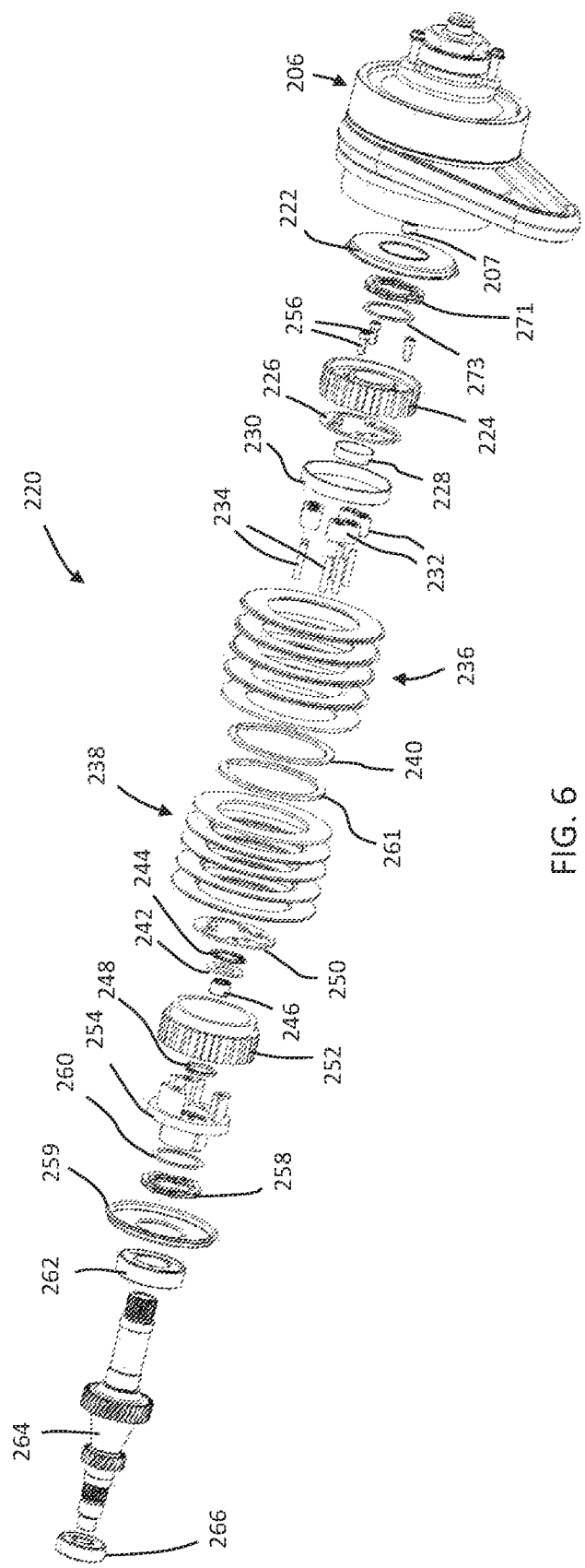
FIG. 6 is an unassembled side view of the side-by-side clutch layout of FIG. 5 according to one exemplary embodiment.
Figure 7:
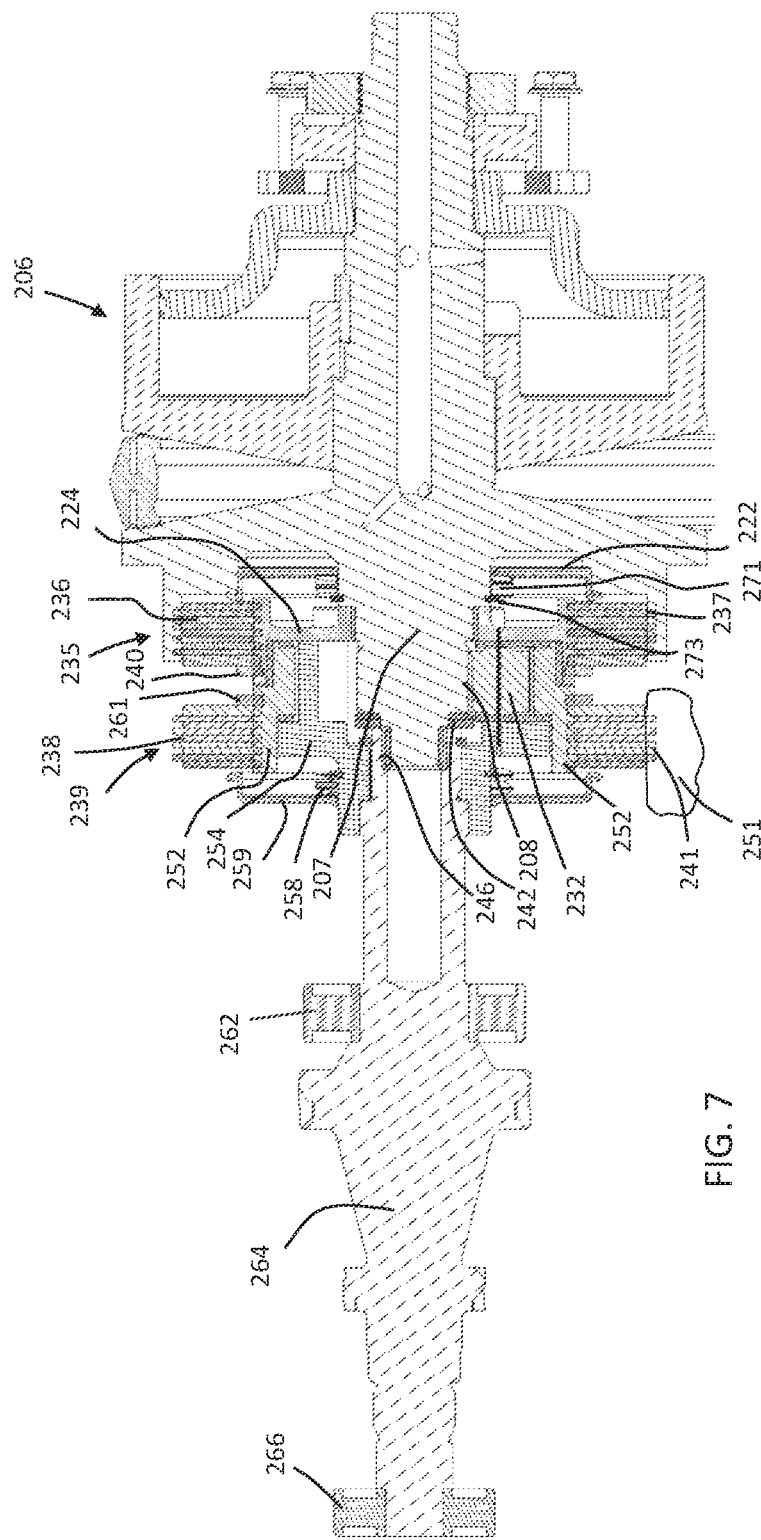
FIG. 7 is an assemble cross-sectional side view of the side-by-side clutch layout of FIG. 6.

An exploded view of the double clutch reverse and active torque management system 220 with the side-by-side layout is illustrated in FIG. 6 and an assembled cross-sectional side view of the double clutch reverse and active torque management system 220 is illustrated in FIG. 7. The secondary sheave 206 in this example includes a sun gear 208 on a sheave shaft 207 of the secondary sheave as best illustrated in the assembled cross-sectional side view of FIG. 7. The double clutch reverse and active torque management system 220 includes a forward clutch piston 222, a reverse clutch piston 259, a forward clutch basket 224, a thrust plate 226, bushings 228 and 230, planet gears 232 and dowel pins 234 as illustrated in FIG. 6.

Also included in the double clutch reverse and active torque management system 220 with the side-by-side layout are a forward variable torque limiting clutch 235, a reverse variable torque limiting clutch 239 and retaining rings 240. As best illustrated in FIG. 7, the forward variable torque limiting clutch 235 includes a first set of the clutch plates 236 that are engaged with the forward clutch basket 224 and a second set of clutch plates 237 are engaged to the secondary sheave 206, either through features built into the secondary sheave 206, or through a separate part coupled to the secondary shaft 207. The forward clutch basket 224, the first and second sets of clutch plates 236 and 237, and forward clutch piston 222 form in part the forward variable torque limiting clutch 235. The forward variable torque limiting clutch 235 is received within a cavity of the secondary sheave 206 in this example.

A retaining ring 273 that is received within a groove of the sheave shaft 207 abuts a first side of a biasing member 271 (which may be a wave spring) that is positioned between the retaining ring 273 and forward clutch piston 222. The biasing member 271 exerts a biasing force on the forward clutch piston 222 away from the forward clutch pack formed by the first and second sets of clutch plates 236 and 237 of the forward limiting clutch 235. In an example, hydraulic pressure may be used to counter the biasing force to allow the forward clutch piston 222 to provide a select force on the forward clutch pack to cause the forward clutch pack to transfer a select amount of torque between the secondary sheave 206 and the forward clutch basket 224. Further, fasteners 256 couple the forward clutch basket 224 to a planet carrier 254 in this example. One side of the forward clutch pack is retained in place with a retaining ring 240 received within a groove on the forward clutch basket 224 in this example.

The reverse variable torque limiting clutch 239 includes a first set of reverse clutch plates 238 and second set of reverse clutch plates 241 that form a reverse clutch pack. In this example, the first set of reverse clutch plates are coupled to the ring gear reverse clutch basket 252 and the second set of reverse clutch plates are coupled to a case 251 (housing). Retaining ring 261 received within a groove on the planet carrier retain the reverse clutch in place. A reverse bias member 258, such as a wave spring in an example, is positioned between the reverse clutch piston 259 and a retaining ring 260 that is received within a groove in the planet carrier 254. The reverse bias member 258 exerts a biasing force on the reverse clutch piston 259 away from the reverse clutch pack formed by the first and second sets of clutch plates 238 and 241 of the reverse limiting clutch 239. In an example, hydraulic pressure may be used to counter the biasing force to allow the reverse clutch piston 259 to provide a select force on the reverse clutch pack to cause the reverse clutch pack to lock a ring gear and reverse clutch basket 252 to the case 251.

A transmission input shaft 264 is in operational communication with the double clutch reverse and active torque management system 220 in this side-by-side layout. In the example provided in FIGS. 6 and 7, a thrust washer 242, needle bearing 246, and thrust bearing 244 interface and end of the transmission input shaft 264 with an end of the sheave shaft 207. Retaining ring 248 received within a groove in the transmission input shaft 264 holds the planet carrier 254 in place. Further, external spines proximate the end of the transmission input shaft 264 engage internal threads of planet carrier 254 to lock rotation of the planet carrier with rotation of the transmission input shaft 264. A retaining ring 260 received within a groove at the end of the transmission input shaft 264 retains the planet carrier 254 on the transmission input shaft 264. Thrust plates 226 and 250 may be positioned adject select end sections of the ring gear and reverse clutch basket 252. Further, bearings 262 and 266 are positioned between portions of the transmission input shaft 264 and the case 251.

The ring gear and reverse clutch basket 252 are positioned to engage the planet gears 232 and a first set of the reverse clutch plates 238 while a second set of the reverse clutch plates 241 would be engaged with a case 251 as best illustrated in FIG. 7. The ring gear and reverse clutch basket 252, the reverse clutch plates and the reverse clutch piston form in part the reverse torque limiting clutch 239.

In this side-by-side layout 200 example, the forward variable torque limiting clutch 235 fixes the sun gear 208 of the sheave shaft 207 to the planet carrier 254. This creates a scenario in which the torque is transmitted through the planet carrier 254 to the planet gears 232 which transmits the torque to the ring gear and reverse clutch basket 252 through planet gear teeth of the planet gears 232 in a way that the sun gear 208, planet gears 232, carrier 254 and ring gear and reverse clutch basket 252 rotate together as a single assembly for a straight through forward gear. When the reverse clutch 239 is active, the ring gear and reverse clutch basket 252 is fixed to the case 251, which allows the planet gears 232 to act as idler gears, which reverses the direction of rotation of the planet carrier 254 and provides an output at a gear reduction of the number of teeth of the ring gear and reverse clutch basket 252 to the number of teeth of the sun gear 208.

In one example, there are two set of planet gears 232 (six planet gears total) in a side-by-side layout. The ring gear is locked in this example to ground. This reverses direction of the planet carrier due to the two sets of planet idlers. In another example side-by-side layout, a single set of plant gears 232 (3 planet gears total) may be used. In this example, the carrier would be locked to the case for reverse and the ring gear would be the output at ratio of the number of teeth of the ring gear to the number of teeth of the sun gear.

The embodiments illustrated in FIGS. 1 through 7 use an epicyclic geared reverse. Examples illustrated in FIGS. 8 through 9 use a parallel axis geared reverse and FIGS. 10 and 11 illustrate an example with a spur gear differential reverse.

Figure 8:
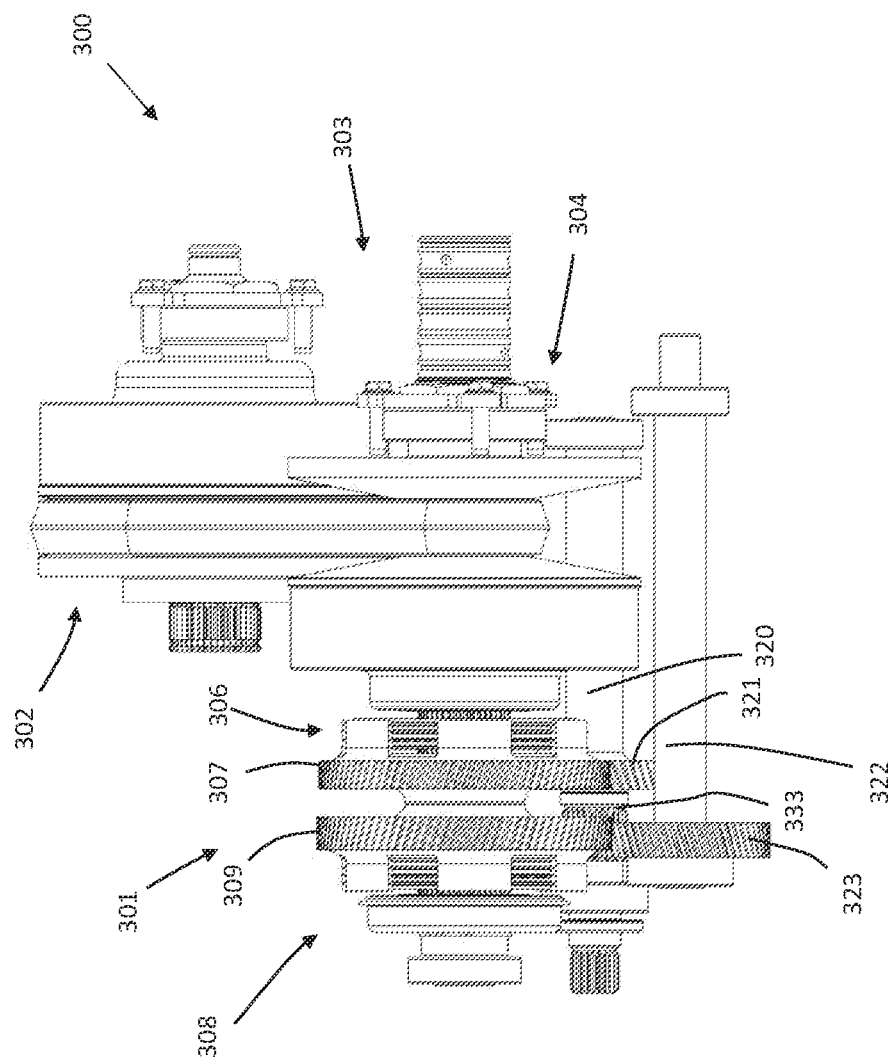
FIG. 8 is a side view of CVT and a double clutch reverse and active torque management system having a parallel axis geared reverse layout according to one exemplary embodiment.
Figure 9:
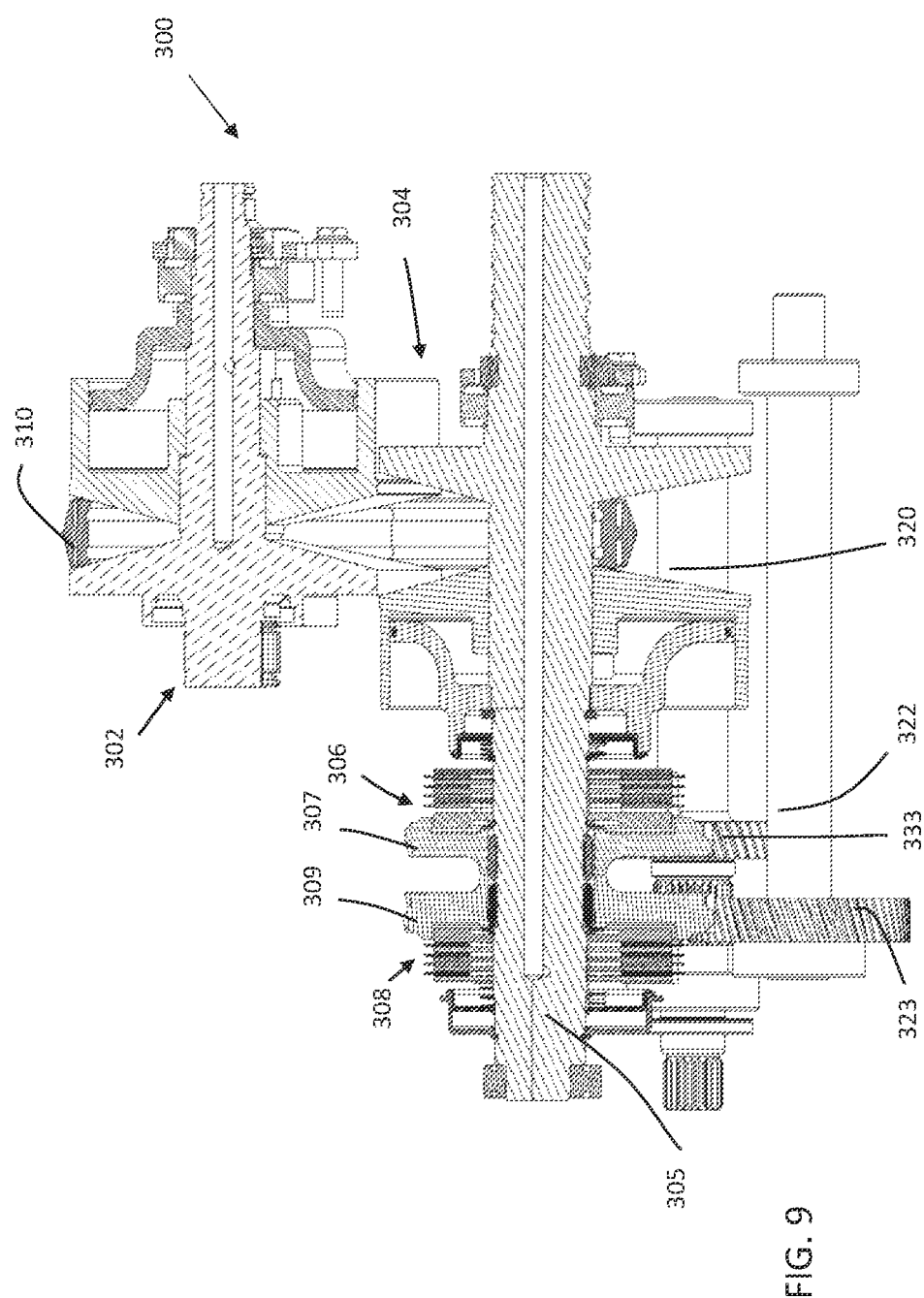
FIG. 9 is cross-sectional side view of CVT and double clutch reverse and active torque management system having the parallel axis geared reverse layout of FIG. 8.

The side view of a CVT 303 and double clutch reverse and active torque management system 301 of FIG. 8 and cross-sectional side view of FIG. 9 illustrate another version of a side-by-side layout 300 with a clutch reversal configuration having parallel axis geared reverse. As illustrated, this parallel axis geared reverse configuration includes a primary or drive sheave 302 and driven sheave 304 which are in rotational communication with each other via belt 310. The driven sheave 304 includes a post 305 in which side-by-side clutches 306 and 308 are mounted. Variable torque limiting clutch 306 is in operational communication with an associated parallelly positioned output shaft 320. Variable torque limiting clutch 308 is in operational communication with associated parallelly positioned idler shaft 322 which is in operational communication with output shaft 320 via idler gear 323. The torque limiting clutch 308 drives the idler gear 323 on the idler shaft 322 which in turn drives a reverse output gear 333 which is located on the output shaft 320.

In this example the two separate variable torque limiting clutches 306 and 308 are driven by the driven sheave 304. One torque limiting clutch 306 drives a gear 321 on the output shaft 320 for forward, and the other torque limiting clutch 308 drives an idler gear 323 on the idler shaft 322 which reverses direction and drives the reverse output gear 333 on the output shaft 320. When the forward variable torque limiting clutch 306 is active, it drives in forward in a ratio of the number of teeth on a forward clutch gear 307 to the number of teeth on a forward output gear 321. When the reverse variable torque limiting clutch 308 is active, it drives an idler gear 323 on the idler shaft 322, which reverses the direction and drives the reverse output gear 333 on the output shaft 320 in a ratio of the number of teeth of the reverse clutch gear 309, to the number of teeth of the reverse output gear 333.

Figure 10:
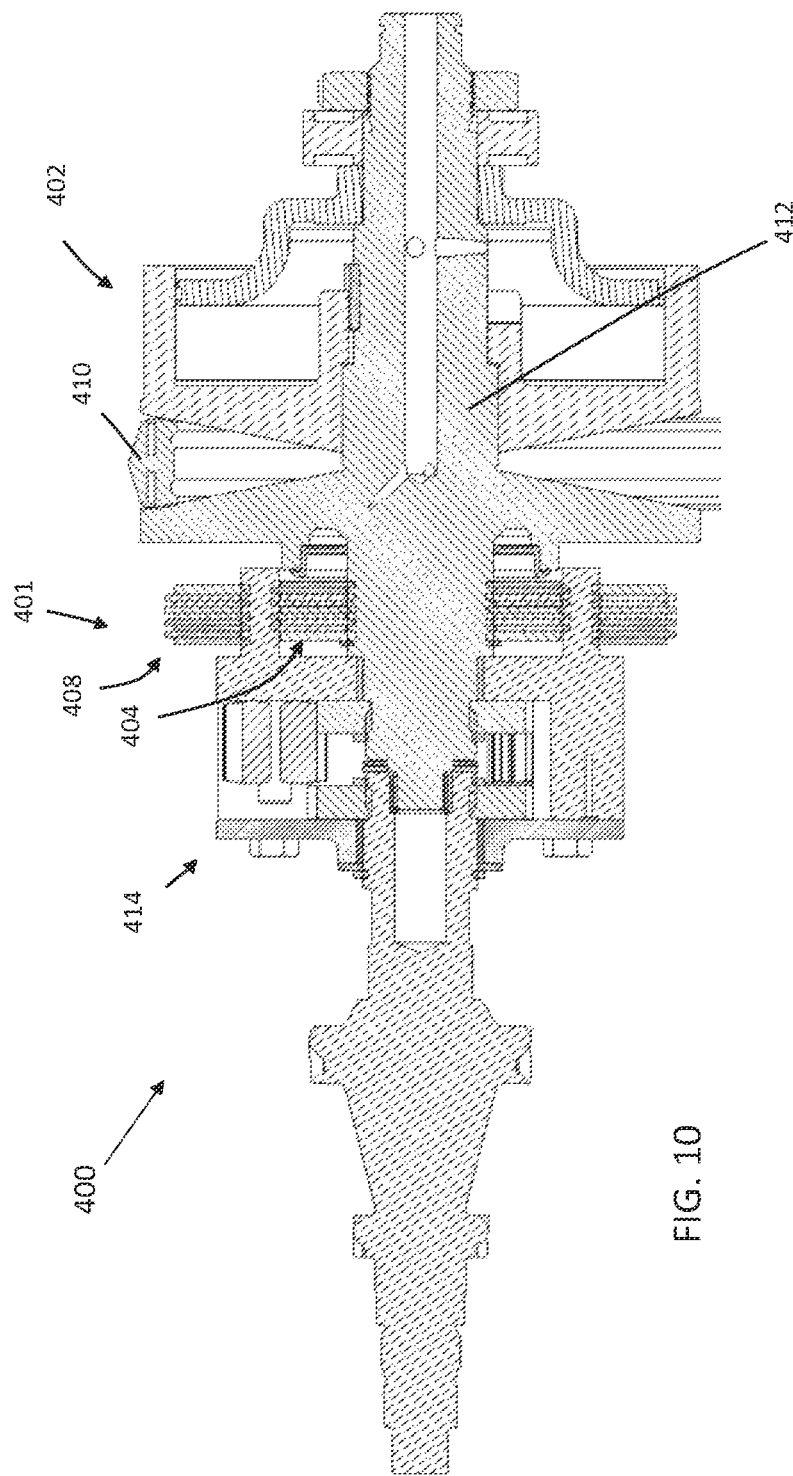
FIG. 10 is a cross-sectional side view of a driven sheave and double clutch reverse and active torque management system with a nested clutch reversal and a spur gear differential reverse layout according to one exemplary embodiment.
Figure 11:
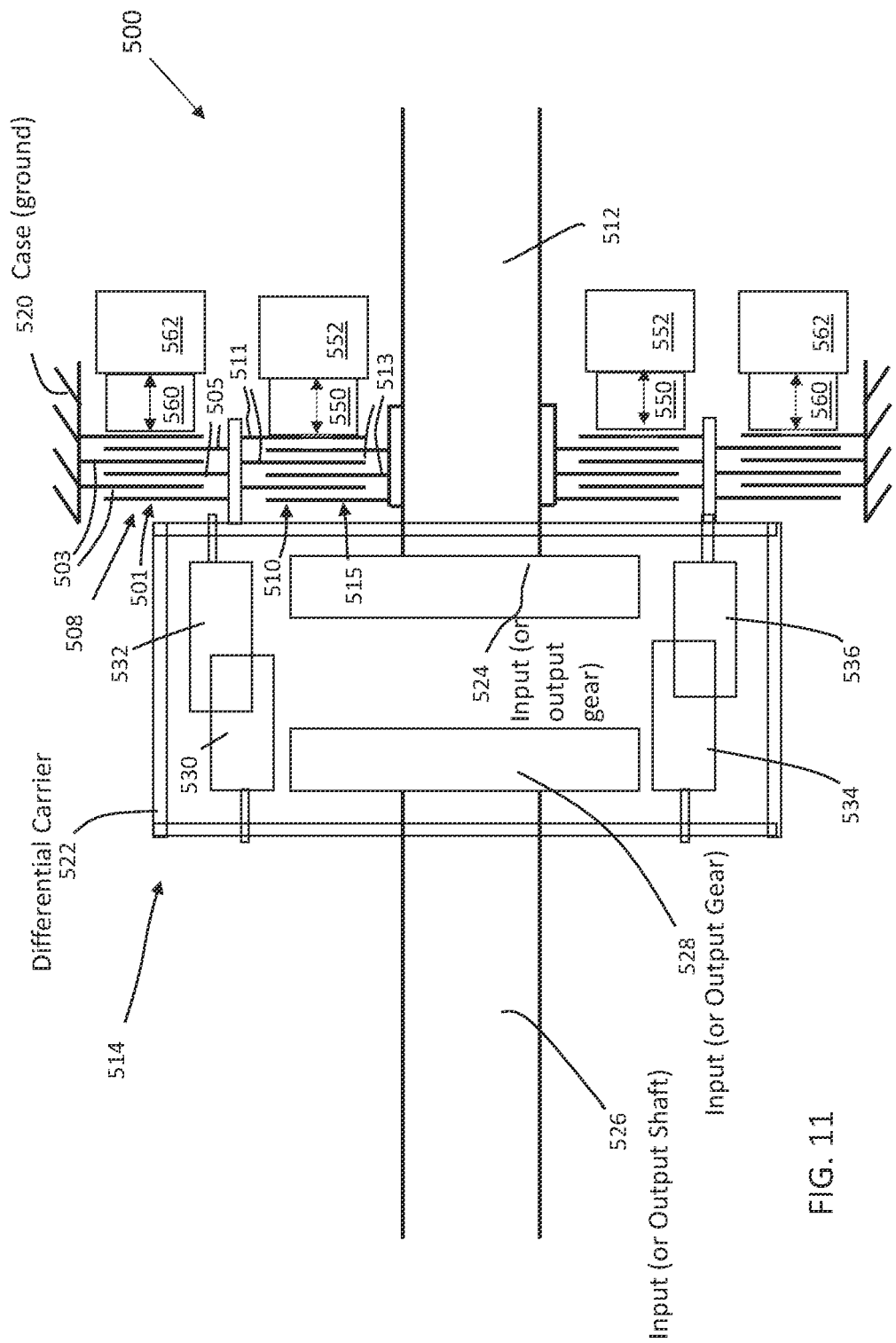
FIG. 11 illustrates a block diagram of a double clutch reverse and active torque management system in a nested double clutch layout according to one exemplary embodiment.

FIG. 10 illustrates a driven sheave 402 of a CVT and a double clutch reverse and active torque management system 401 having a nested clutch reversal with a spur gear differential reverse layout. In particular, FIG. 10 illustrates a cross-sectional side view of a nested clutch reversal configuration with a spur gear differential reverse layout 400. A belt 410 rotationally connects the driven sheave 402 to a drive sheave (not shown) as part of a CVT. This layout includes an inner clutch 404 and an outer clutch 408 that form the nested clutch. The secondary sheave 402 further includes a post 412 and a spur gear differential reverse assembly 414.

A block diagram of a double clutch reverse and active torque management system 500 with a nested torque limiting clutch layout of an example embodiment is illustrated in FIG. 11. The example of FIG. 11 also employs a spur gear differential 514 with a reverse. As illustrated, an outer torque limiting clutch 508 (reverse torque limiting clutch 40) includes a reverse clutch pack 501 of a first set of reverse clutch plates 503 that are coupled to a case 520 (ground) and a second set of reverse clutch plates 505 that are coupled to a differential carrier 522. Further, an inner torque limiting clutch 510 (forward torque limiting clutch) includes a forward clutch pack 515 of a first set of forward clutch plates 511 coupled to the differential carrier 522 and a second set of forward clutch plates 513 coupled to a first shaft 512 (or first post).

The first shaft 512 in this example, includes a first gear 524 positioned within the differential carrier 522. The first shaft 512 may be an input shaft or output shaft and the first gear may be an input gear or output gear (input/output gear) depending on the application. A second shaft 526 includes a second input/output gear 528. The spur gear differential 514 also includes planet gears 530, 532, 534 and 536. One or more planet gears 530, 532, 534 and 536 are communicationally engaged with one of the input/output gears 524 and 528 of the respective input and output shafts 526 and 512. The forward clutch 510 may be operationally engaged with either the first or second shafts (input or output shafts) 526 or 512. In an example, the first shaft 512 is a sheave shaft of a driven sheave of a CVT. In this example, the forward clutch 510 is operationally engaged with the first shaft 512 which is the sheave shaft of the driven sheave.

In this example, to achieve forward operation, only the forward torque limiting clutch 510 is actuated. This locks the differential carrier 522 and causes straight through operation. To achieve reverse operation, the reverse torque limiting clutch 508 is locked. This causes reverse operation with a gear ratio of the number of teeth on the output gear (524 or 528) to the number of teeth on the input gear (528 or 524).

Also illustrated in FIG. 11 is a reverse clutch piston 560 that acts on the reverse clutch pack to selectively couple the case 520 to differential carrier 522. The reverse clutch piston 560 is controlled by a reverse actuator system 562. A forward clutch piston 550 that acts on the forward clutch pack to selectively couple the differential carrier 522 to shaft 512. The forward clutch piston 550 is controlled by a forward actuator system 552. The forward actuator system 552 and the reverse actuator system 562 may be hydraulic systems or part of one hydraulic system in one example embodiment. In other embodiments, the forward actuator system 552 and the reverse actuator system 562 may be part of a ball ramp system, electronic solenoid system, mechanical lever system, throw cam system or any other system for actuating a clutch.

Figure 12:
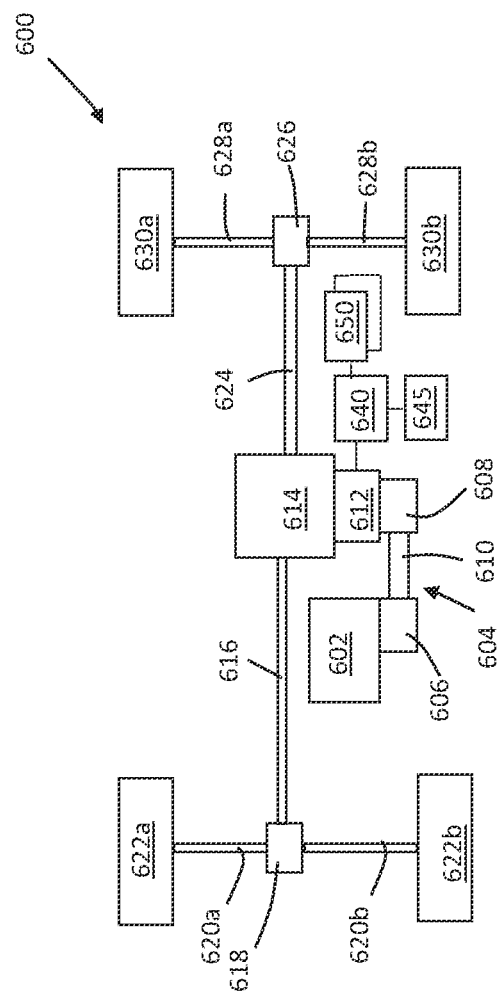
FIG. 12 is a block diagram of a vehicle with double clutch reverse and active torque management system according to one exemplary embodiment.

Referring to FIG. 12 a block diagram of a vehicle 600 that includes a double clutch reverse and active torque management system 612 of an example is illustrated. The vehicle includes a motor 602, such as but not limited to, an internal combustion engine (ICE), electrical motor etc., that generates engine torque. On output of the motor 602 is communicated to a drive sheave 606 of a CVT 604. The drive sheave 606 is in operation communication with a driven sheave 608 via endless loop 610, such as a belt. The driven sheave 608 is in operational communication with a drivetrain via the double clutch reverse and active torque management system 612. The double clutch reverse and active torque management system 612 is in operational communication with a gear box 614 (transmission) of a drivetrain of the vehicle. The drivetrain in this example further includes the gear box 614, a front prop shaft 616, a rear prop shaft 624, a front differential 618, a rear differential 626, front half shafts 620a and 620b (or front drive axles), rear half shafts 628a and 628b (or rear drive axles), front wheels 622a and 622b, and rear wheels 630a and 630b. In another example, the double clutch reverse and active torque management system 612 may be part of a transaxle that may include the gear box 614 and one of the front differential 618 and the rear differential 626.

The front differential 618, in the example of FIG. 12, is in operational communication with the gear box 614 via front prop shaft 616. Further, the front differential 618 is in operational communication with front wheels 622a and 622b via front half shafts 620a and 620b (or front drive axles). The gear box 614 is also in operational communication with a rear differential 626 via rear prop shaft 624 in this example. The rear differential 626 in turn is in operational communication with rear wheels 630a and 630b via front half shafts 628a and 628b.

Further illustrated in this example is a controller 640 that is in communication with one or more sensors 650. The controller is configured to control the double clutch reverse and active torque management system 612 based on sensor signals from the at least one sensor 650 and operational instructions stores in memory 645. The sensors may include, but are not limited to, speed sensors, acceleration sensors, throttle positioning sensors, RPM sensors, temperature sensors, braking sensors, torque sensors, operator input sensor, etc. In one example, the controller, based on at operating instructions and sensor information varies the amount of torque each forward and reverse variable torque limiting clutch can transfer such that it is greater than the output torque of the CVT, but less than the transmittable torque of the CVT. That is, an active forward or reverse variable torque limiting clutch is controlled to transmit all the torque to the ground, but it will slip at a lower torque than the CVT to prevent damage to the CVT.

In general, the controller 640 may include any one or more of a processor, microprocessor, a digital signal processor (DSP), an application specific integrated circuit (ASIC), a field program gate array (FPGA), or equivalent discrete or integrated logic circuitry. In some example embodiments, controller 640 may include multiple components, such as any combination of one or more microprocessors, one or more controllers, one or more DSPs, one or more ASICs, one or more FPGAs, as well as other discrete or integrated logic circuitry. The functions attributed to the controller 640 herein may be embodied as software, firmware, hardware or any combination thereof. The controller 640 may be part of a system controller or a component controller such as, but not limited to an engine control module or transmission control module. The memory 645 may include computer-readable operating instructions that, when executed by the controller provides functions of the double clutch reverse and active torque management system. Such functions may include the functions of controlling the forward actuator system 552 and the reverse actuator system 562 to selectively activate and adjust torque transfer of the respective forward clutch pack 515 and reverse clutch pack 501 with the respective forward piston 550 and reverse piston 560. The computer readable instructions may be encoded within the memory. Memory is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Example Embodiments

Example 1 includes a double clutch reverse and active torque management system. The system includes a forward variable torque limiting clutch and a reverse variable torque limiting clutch. The forward variable torque limiting clutch selectively couples torque between a driven sheave of a continuously variable transmission (CVT) and at least one drive axle of a vehicle when the vehicle is traveling in a forward direction. The forward variable torque limiting clutch is set to transmit less torque than can be transmitted through each of a drive sheave and the driven sheave of the CVT. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of the CVT, wherein any slip caused by excessive torque occurs at one of the forward variable torque limiting clutch and the reverse variable torque limiting clutch.

Example 2 includes the system of Example 1, wherein the forward variable torque limiting clutch and the reverse variable torque limiting clutch are in a nested clutch configuration.

Example 3 includes the system of Example 2, wherein the forward variable torque limiting clutch includes a forward clutch pack that selectively couples torque between a sheave shaft of the driven sheave and a clutch basket; and the reverse variable limiting clutch includes a reverse clutch pack that selectively couples torque between the clutch basket and a retaining member that is coupled to a case.

Example 4 includes the system of Example 3, further including an epicyclic gear set configured to couple torque in a reverse direction when the reverse clutch pack is activated and in a forward direction when the forward clutch pack is activated.

Example 5 includes the system of Example 4, wherein the epicyclic gear set includes a planet carrier coupled to the clutch basket; a sun gear coupled to the sheave shaft; and a plurality of planet gears engaged between the sun gear, the planet carrier, and a ring gear.

Example 6 includes the system of Example 1, wherein the forward variable torque limiting clutch and the reverse variable torque limiting clutch are in a side-by-side clutch configuration.

Example 7 includes the system of Example 6, wherein the forward variable torque limiting clutch includes a forward clutch pack that selectively couples torque between the driven sheave and a forward clutch basket; and the reverse variable limiting clutch includes a reverse clutch pack that selectively locks torque between a ring gear and reverse clutch basket and a case.

Example 8 includes the system of Example 7, further including a sun gear on a sheave shaft of the drive sheave; and a plurality of planet gears engaged between the sun gear and the ring gear and reverse clutch basket.

Example 9 includes the system of Example 1, further including a differential carrier and a plurality of planet gears. The forward variable torque limiting clutch selectively couples torque between the differential carrier and a sheave shaft of the drive sheave. The reverse variable torque limiting clutch selectively couples torque between the differential carrier and a case. The plurality of planet gears are operationally coupled to the differential carrier. At least one planet gear is operationally engaged with an input gear on the sheave shaft.

Example 10 includes the system of Example 1, further including an output shaft including a reverse output gear and an idler shaft including an idler gear. The reverse variable torque limiting clutch selectively couples torque between the idler gear and the reverse output gear when activated.

Example 11 incudes a double clutch reverse and active torque management system. The system includes a forward variable torque limiting clutch, a forward actuator, a reverse variable limiting clutch, and a reverse actuator. The forward variable torque limiting clutch selectively couples torque between a driven sheave of a continuously variable transmission (CVT) and at least one drive axle of a vehicle when the vehicle is traveling in a forward direction. The forward variable torque limiting clutch is set to transmit less torque than can be transmitted through each of a drive sheave and the driven sheave of the CVT. The forward variable torque limiting clutch includes a forward clutch pack. The forward actuator is in operational communication with a forward piston to selectively assert a force on the forward clutch pack to activate the forward variable torque limiting clutch. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of the CVT. The reverse variable torque limiting clutch includes a reverse clutch pack. The reverse actuator is in operational communication with a reverse piston to selectively assert a force on the reverse clutch pack to activate the reverse variable torque limiting clutch.

Example 12 includes the system of Example 11, wherein layouts used with the double clutch reverse and active torque management system include one of an epicyclic reverse containing one or more sets of planet gears, a parallel axis gear reverse, and a spur gear differential used to achieve reverse.

Example 13 includes the system of Example 11, wherein the forward variable torque limiting clutch and the reverse variable torque limiting clutch are in a nested clutch configuration further including the driven sheave including a sheave shaft; a clutch basket, the forward clutch pack selectively coupling torque between the sheave shaft and the clutch basket; a case the reverse clutch pack selectively coupling torque between the clutch basket and a retaining member that is coupled to a case to selectively lock the clutch basket to the case; and an epicyclic gear set configured to couple torque in a reverse direction when the reverse clutch pack is activated, the epicyclic gear set including, a planet carrier coupled to the clutch basket; a sun gear coupled to the sheave shaft; and a plurality of planet gears engaged between the sun gear and the planet carrier.

Example 14 includes the system of Example 11, wherein the forward variable torque limiting clutch and the reverse variable torque limiting clutch are in a side-by-side clutch configuration further including a forward clutch basket. The forward clutch pack selectively couples torque between the driven sheave and the forward clutch basket. The system further including a ring gear and reverse clutch basket, a case, a sun gear and a plurality of planet gears. The reverse clutch pack selectively locking torque between the ring gear and reverse clutch basket and the case. The sun gear is on a sheave shaft of the drive sheave. The plurality of planet gears are engaged between the sun gear and the ring gear and reverse clutch basket.

Example 15 includes the system of Example 11, further including a differential carrier. The forward variable torque limiting clutch selectively couples torque between the differential carrier and a sheave shaft of the drive sheave. The reverse variable torque limiting clutch selectively couples torque between the differential carrier and a case. A plurality of planet gears are operationally coupled to the differential carrier. At least one planet gear is operationally engaged with an input gear on the sheave shaft.

Example 16 includes a system of Example 11, further comprising an output shaft including a reverse output gear and an idler shaft including an idler gear. The reverse variable torque limiting clutch selectively coupling torque between the idler gear and the reverse output gear when activated and the forward variable torque limiting clutch selectively couples torque between the driven sheave and the output shaft when activated.

Example 17 includes the system of any of the Examples 11-16, further comprising a memory, at least one sensor, and a controller. The memory is used to store at least operating instructions. The at least one sensor is configured to generate sensor information. The controller is configured to control activation of the forward variable limiting clutch and the reverse variable limiting clutch based at least in part on the stored operating instructions and the sensor information.

Example 18 includes a vehicle including a motor to generate engine torque, a CVT, a belt, at least one drive axle and a double clutch reverse and active torque management system. The CVT including a drive sheave and a driven sheave. The belt is communicatively engaged with the drive sheave and the driven sheave. The double clutch reverse and active torque management system includes a forward variable torque limiting clutch and a reverse variable torque limiting clutch. The forward variable torque limiting clutch selectively couples torque between the driven sheave of the CVT and the at least one drive axle of the vehicle when the vehicle is traveling in a forward direction. The forward variable torque limiting clutch is set to transmit less torque than can be transmitted through each of the drive sheave and driven sheave of the CVT. The reverse variable torque limiting clutch selectively couples torque between the driven sheave and the at least one drive axle of the vehicle when the vehicle is traveling in a reverse direction. The reverse variable torque limiting clutch is set to transmit less torque than can be transmitted through each of the drive sheave and driven sheave of the CVT, wherein any slip caused by excessive torque occurs at one of the forward variable torque limiting clutch and the reverse variable torque limiting clutch.

Example 19 includes the vehicle of claim 18, wherein the double clutch reverse and active torque management system further uses a layout that includes one of an epicyclic reverse containing one or more sets of planet gears, a parallel axis gear reverse, and a spur gear differential used to achieve reverse.

Example 20 includes the vehicle of any of the Examples 18-19, further including a memory, at least one sensor, and a controller. The memory stores at least operating instructions. The at least one sensor is configured to generate sensor information. The controller is configured to control activation of the forward variable limiting clutch and the reverse variable limiting clutch based at least in part on the stored operating instructions and the sensor information.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A double clutch reverse and active torque management system, the system comprising:
   a forward variable torque limiting clutch selectively coupling torque between a driven sheave of a continuously variable transmission (CVT) and at least one drive axle of a vehicle when the vehicle is traveling in a forward direction;
   a reverse variable torque limiting clutch selectively coupling torque between the driven sheave and the at least one drive axle of the vehicle when the vehicle is traveling in a reverse direction; and at least one controller configured to vary a torque transfer amount that the forward variable torque limiting clutch and the reverse variable torque limiting clutch can transmit based on operating instructions and sensor information so the torque transfer amount is greater than an output torque of the CVT and less than a transmittable torque of the CVT, wherein any slip caused by excessive torque occurs at one of the forward variable torque limiting clutch and the reverse variable torque limiting clutch.

2. The system of claim 1, wherein the forward variable torque limiting clutch and the reverse variable torque limiting clutch are in a nested clutch configuration.

3. The system of claim 2, further wherein:
the forward variable torque limiting clutch includes a forward clutch pack that selectively couples torque between a sheave shaft of the driven sheave and a clutch basket; and
the reverse variable limiting clutch includes a reverse clutch pack that selectively couples torque between the clutch basket and a retaining member that is coupled to a case.

4. The system of claim 3, further comprising:
an epicyclic gear set configured to couple torque in a reverse direction when the reverse clutch pack is activated and in a forward direction when the forward clutch pack is activated.

5. The system of claim 4, wherein the epicyclic gear set comprises:
a planet carrier coupled to the clutch basket;
a sun gear coupled to the sheave shaft; and
a plurality of planet gears engaged between the sun gear, the planet carrier, and a ring gear.

6. The system of claim 1, wherein the forward variable torque limiting clutch and the reverse variable torque limiting clutch are in a side-by-side clutch configuration.

7. The system of claim 6, further wherein:
the forward variable torque limiting clutch includes a forward clutch pack that selectively couples torque between the driven sheave and a forward clutch basket; and
the reverse variable limiting clutch includes a reverse clutch pack that selectively locks torque between a ring gear and reverse clutch basket and a case.

8. The system of claim 7, further comprising:
a sun gear on a sheave shaft of the drive sheave; and
a plurality of planet gears engaged between the sun gear and the ring gear and reverse clutch basket.

9. The system of claim 1, further comprising:
a differential carrier, the forward variable torque limiting clutch selectively coupling torque between the differential carrier and a sheave shaft of the drive sheave, the reverse variable torque limiting clutch selectively coupling torque between the differential carrier and a case; and
a plurality of planet gears operationally coupled to the differential carrier, at least one planet gear operationally engaged with an input gear on the sheave shaft.

10. The system of claim 1, further comprising:
an output shaft including a reverse output gear; and
an idler shaft including an idler gear, wherein the reverse variable torque limiting clutch selectively couples torque between the idler gear and the reverse output gear when activated.

11. A double clutch reverse and active torque management system, the system comprising:
a forward variable torque limiting clutch selectively coupling torque between a driven sheave of a continuously variable transmission (CVT) and at least one drive axle of a vehicle when the vehicle is traveling in a forward direction, the forward variable torque limiting clutch including a forward clutch pack;
a forward actuator in operational communication with a forward piston to selectively assert a force on the forward clutch pack to activate the forward variable torque limiting clutch;
a reverse variable torque limiting clutch selectively coupling torque between the driven sheave and the at least one drive axle of the vehicle when the vehicle is traveling in a reverse direction, the reverse variable torque limiting clutch including a reverse clutch pack; and
a reverse actuator in operational communication with a reverse piston to selectively assert a force on the reverse clutch pack to activate the reverse variable torque limiting clutch; and
at least one controller configured to vary a torque transfer amount that the forward variable torque limiting clutch and the reverse variable torque limiting clutch can transmit based on operating instructions and sensor information so the torque transfer amount is greater than an output torque of the CVT and less than a transmittable torque of the CVT by controlling the forward actuator and reverse actuator, wherein any slip caused by excessive torque occurs at one of the forward variable torque limiting clutch and the reverse variable torque limiting clutch.

12. The system of claim 11, wherein layouts used with the double clutch reverse and active torque management system include one of an epicyclic reverse containing one or more sets of epicyclic gears, a parallel axis gear reverse, and a spur gear differential used to achieve reverse.

13. The system of claim 11, wherein the forward variable torque limiting clutch and the reverse variable torque limiting clutch are in a nested clutch configuration further comprising:
the driven sheave including a sheave shaft;
a clutch basket, the forward clutch pack selectively coupling torque between the sheave shaft and the clutch basket;
a case, the reverse clutch pack selectively coupling torque between the clutch basket and a retaining member that is coupled to the case to selectively lock the clutch basket to the case; and
an epicyclic gear set configured to couple torque in a reverse direction when the reverse clutch pack is activated, the epicyclic gear set including,
a planet carrier coupled to the clutch basket,
a sun gear coupled to the sheave shaft, and
a plurality of planet gears engaged between the sun gear and the planet carrier.

14. The system of claim 11, wherein the forward variable torque limiting clutch and the reverse variable torque limiting clutch are in a side-by-side clutch configuration further comprising:
a forward clutch basket, the forward clutch pack selectively coupling torque between the driven sheave and the forward clutch basket;
a ring gear and reverse clutch basket;

a case, the reverse clutch pack selectively locking torque between the ring gear and reverse clutch basket and the case;
a sun gear on a sheave shaft of the drive sheave; and
a plurality of planet gears engaged between the sun gear and the ring gear and reverse clutch basket.

15. The system of claim 11, further comprising:
a differential carrier, the forward variable torque limiting clutch selectively coupling torque between the differential carrier and a sheave shaft of the drive sheave, the reverse variable torque limiting clutch selectively coupling torque between the differential carrier and a case; and
a plurality of planet gears operationally coupled to the differential carrier, at least one planet gear operationally engaged with an input gear on the sheave shaft.

16. The system of claim 11, further comprising:
an output shaft including a reverse output gear; and
an idler shaft including an idler gear, wherein the reverse variable torque limiting clutch selectively couples torque between the idler gear and the reverse output gear when activated and the forward variable torque limiting clutch selectively couples torque between the driven sheave and the output shaft when activated.

17. The system of claim 11, further comprising:
a memory to store at least operating instructions;
at least one sensor configured to generate sensor information; and
a controller configured to control activation of the forward variable limiting clutch and the reverse variable limiting clutch based at least in part on the stored operating instructions and the sensor information.

18. A vehicle comprising:
a motor to generate engine torque;
a continuously variable transmission (CVT) including a drive sheave and a driven sheave;
a belt communicatively engaged with the drive sheave and the driven sheave;
at least one drive axle;
a double clutch reverse and active torque management system including,
a forward variable torque limiting clutch selectively coupling torque between the driven sheave of the CVT and the at least one drive axle of the vehicle when the vehicle is traveling in a forward direction;
a reverse variable torque limiting clutch selectively coupling torque between the driven sheave and the at least one drive axle of the vehicle when the vehicle is traveling in a reverse direction; and
at least one controller configured to vary a torque transfer amount that the forward variable torque limiting clutch and the reverse variable torque limiting clutch can transmit based on operating instructions and sensor information so the torque transfer amount is greater than an output torque of the CVT and less than a transmittable torque of the CVT, wherein any slip caused by excessive torque occurs at one of the forward variable torque limiting clutch and the reverse variable torque limiting clutch.

19. The vehicle of claim 18, wherein the double clutch reverse and active torque management system further uses a layout that includes one of an epicyclic reverse containing one or more sets of planet gears, a parallel axis gear reverse, and a spur gear differential used to achieve reverse.

20. The vehicle of claim 18, further comprising:
a memory to store at least operating instructions;
at least one sensor configured to generate sensor information; and
a controller configured to control activation of the forward variable limiting clutch and the reverse variable limiting clutch based at least in part on the stored operating instructions and the sensor information.

* * * * *